(12) United States Patent
Stechmann

(10) Patent No.: US 11,746,808 B2
(45) Date of Patent: Sep. 5, 2023

(54) APPARATUS AND SYSTEM FOR SECURING HARDWARE TO A STRUCTURE UTILIZING TORSIONAL JOINTS

(71) Applicant: Eric Stechmann, Liberty, MO (US)

(72) Inventor: Eric Stechmann, Liberty, MO (US)

(*) Notice: Subject to any disclaimer, the term of this patent is extended or adjusted under 35 U.S.C. 154(b) by 0 days.

(21) Appl. No.: 17/457,226

(22) Filed: Dec. 1, 2021

(65) Prior Publication Data

US 2022/0082117 A1 Mar. 17, 2022

Related U.S. Application Data

(63) Continuation-in-part of application No. 17/018,522, filed on Sep. 11, 2020, now Pat. No. 11,274,774, which is a continuation-in-part of application No. 15/437,000, filed on Feb. 20, 2017, now Pat. No. 10,808,883, which is a continuation-in-part of application No. 15/009,398, filed on Jan. 28, 2016, now Pat. No. 9,577,417, which is a continuation-in-part of application No. 14/252,629, filed on Apr. 14, 2014, now Pat. No. 9,252,581.

(60) Provisional application No. 61/811,424, filed on Apr. 12, 2013.

(51) Int. Cl.
| | |
|---|---|
| *F16B 5/00* | (2006.01) |
| *F16L 3/00* | (2006.01) |
| *F16L 13/00* | (2006.01) |
| *F16B 5/02* | (2006.01) |
| *F16B 1/00* | (2006.01) |

(52) U.S. Cl.
CPC .............. *F16B 5/0004* (2013.01); *F16L 3/00* (2013.01); *F16B 1/00* (2013.01); *F16B 5/0096* (2013.01); *F16B 5/02* (2013.01); *F16L 13/00* (2013.01)

(58) Field of Classification Search
CPC ........ F16B 5/0004; F16B 5/0096; F16B 5/02; F16B 1/00; F16B 1/0014; F16L 3/00; F16L 13/00; F16L 13/14; F16L 3/17
See application file for complete search history.

(56) References Cited

U.S. PATENT DOCUMENTS

| | | |
|---|---|---|
| 3,518,884 A | 7/1970 | Wood, Jr. |
| 3,547,385 A | 12/1970 | Kindorf |
| 4,044,428 A | 8/1977 | Kowalski |
| 4,078,752 A | 3/1978 | Kindorf |
| 4,613,847 A | 9/1986 | Scolari |

(Continued)

FOREIGN PATENT DOCUMENTS

CN 213629622 U * 7/2021

*Primary Examiner* — Tan Le
(74) *Attorney, Agent, or Firm* — Lathrop GPM LLP; Robert J. Lambrechts

(57) ABSTRACT

Disclosed herein is an apparatus for mounting hardware to a surface of a structure. The apparatus includes a main body with an upper surface, a lower surface, and an outer edge. The apparatus also includes a distal pad with an upper and a lower planar surface, the distal pad being attached to the main body by at least two torsional joints. The apparatus also includes an attachment device with a contact surface, the attachment device is mounted to at least one of the planar surfaces. The contact surface is for engagement with the surface of the structure. The at least two torsional joints and distal pad may be manually rotated to achieve maximal surficial contact between the surface of the structure and the contact surface of the attachment device.

31 Claims, 11 Drawing Sheets

(56) References Cited

U.S. PATENT DOCUMENTS

| | | | |
|---|---|---|---|
| 4,907,769 | A | 3/1990 | Hunley et al. |
| 5,623,801 | A | 4/1997 | Drumbl |
| 5,699,910 | A | 12/1997 | Kubat |
| 5,984,243 | A | 11/1999 | Pfaller |
| 6,250,681 | B1 | 6/2001 | Takahashi |
| 6,622,976 | B1 * | 9/2003 | Ianello .................... F16L 3/243 |
| | | | 248/74.2 |
| 6,945,735 | B1 | 9/2005 | Doverspike |
| 7,354,360 | B1 | 4/2008 | Eckstein |
| 7,478,789 | B2 * | 1/2009 | Yukawa ................ G06F 3/0202 |
| | | | 248/371 |
| 7,624,957 | B2 | 12/2009 | Klein |
| 8,235,235 | B1 | 8/2012 | Lusch |
| 8,336,168 | B2 * | 12/2012 | Huang .................. G06F 1/1681 |
| | | | 16/369 |
| 8,413,734 | B2 | 4/2013 | Silcox et al. |
| 8,439,316 | B2 | 5/2013 | Feige |
| 8,423,120 | B2 | 9/2013 | Asano et al. |
| 8,523,120 | B2 | 9/2013 | Asano |
| 9,004,422 | B2 | 4/2015 | Feemstra |
| 9,188,276 | B2 | 11/2015 | Klein |
| 9,577,417 | B2 * | 2/2017 | Stechmann ............... F16B 1/00 |
| 9,889,327 | B2 | 2/2018 | Mitchell |
| 2008/0200856 | A1 * | 8/2008 | Cadichon .............. A61F 5/0123 |
| | | | 602/26 |
| 2008/0277539 | A1 * | 11/2008 | Lee ........................ F16M 11/10 |
| | | | 248/157 |
| 2012/0049013 | A1 | 3/2012 | Klein |

\* cited by examiner

APPARATUS AND SYSTEM FOR SECURING HARDWARE TO A STRUCTURE UTILIZING TORSIONAL JOINTS

RELATED APPLICATIONS

This application is a continuation-in-part application of U.S. application Ser. No. 17/018,522 filed on Sep. 11, 2020 which is a continuation in part to U.S. application Ser. No. 15/437,000 filed on Feb. 20, 2017, now U.S. Pat. No. 10,808,883 which issued on Oct. 20, 2020, which is a continuation-in-part to U.S. application Ser. No. 15/009,398 filed on Jan. 28, 2016, now U.S. Pat. No. 9,577,417 which issued on Feb. 21, 2017, which is a continuation-in-part to U.S. application Ser. No. 14/252,629 filed on Apr. 4, 2014, now U.S. Pat. No. 9,252,581 which issued on Feb. 2, 2016 which claims priority from U.S. Provisional Application No. 61/811,424 filed Apr. 12, 2013. The contents of these applications are incorporated herein by reference in their entireties.

FIELD OF THE DISCLOSURE

This disclosure relates to brackets and mounting systems. More specifically, this disclosure concerns brackets and mounting systems for securing hardware to structures in a wide range of orientations with various surface materials.

BACKGROUND

Historically, equipment from communication and electrical installations including coaxial cables, conduit, wires, and other components which vertically traverse elevated structures have been fastened directly to worker access structures including; ladders, ladder cages, and hand rails. These structures have provided an immediate solution for equipment fastening. However, this type of installation has historically presented unsafe working conditions for the workers by obstructing and encumbering movement and rescue throughout access areas.

These installations may cause maintenance and/or structural damage when installed on areas which lack initial design and structural capability. Aside from fastening communication devices onto the previously discussed areas, a commonly employed installation technique includes welding or banding of communication brackets and raceways along the length of vertical steel. Many of these installations, however, have historically been of high cost and are associated with additional safety, structural, and maintenance issues.

The United States Occupational Safety and Health Administration's (OSHA) current regulations stipulate against specific obstructive encumbrances upon or within worker or rescuer access areas. Other national U.S. and state agencies also provide regulatory and design stipulations further prohibiting obstructions into and within these areas. More specifically, traditional fastening of communication and electrical equipment onto areas such as ladders encumber the fluid motion of the workers' hands when grasping and transitioning along the side-rails. Fastening devices such as clamps and bolted connections commonly encumber foot placement on rungs and further create abrasion risks for the worker or rescuer. Many coaxial cables used in the telecommunication industry emit radio-frequency waves. When workers and rescuers are subjected to these close-proximity coaxial cable installations they face exposure to radio-frequency waves which are known to cause bodily harm.

Elevated steel structures and associated access structures are commonly coated with expensive corrosion resistant high-performance materials to limit corrosion through environmental exposure to the steel. Many of these materials need to be maintained according to industry standards derived from the Society for Protective Coatings, the National Association of Corrosion Engineers, and the American Water Works Association. When scheduled for routine maintenance and renovation work, many of the traditional fastening methods are difficult to temporarily move off or away from the steel. In some cases, coordination of a temporary removal of the communication equipment may allow for a non-obstructed steel structure during its time of maintenance.

Many of these cables and antennae are temporarily re-erected onto a Cell-On-Wheels (C.O.W.) which is usually an expensive and logistically difficult scenario. Due to the cost of the telecommunication equipment and ownership, many steel structure maintenance providers are prohibited from removing or repositioning such equipment. It is common for this telecommunication equipment to remain fastened to the coated steel surface, presenting a surface preparation and coating obstruction. This, in turn, causes the obstructed steel areas to not receive the proper corrosion repair and application of coatings. Furthermore, many installations induce abrasion and corrosion to the steel structure through cyclic abrasive action between coatings and fastening connections and by increasing the moisture content below and adjacent to the fastening area.

A traditional method of fastening communications equipment away from access areas includes weld-fastening coated steel stand-off brackets in series along the structural steel body. The cables can then be secured to these firmly welded "stand-off" brackets. Welding steel brackets onto the structure, especially an existing structure, is usually expensive, time intensive, requires specialized equipment and certification. In the case of weld-fastening onto a coated steel structure, the installation procedure must include abrasive removal of the coatings and oxidized metal in the areas of welding.

This creates a breach in the homogenous corrosion resistance application to the steel which may cause accelerated corrosion if left improperly repair coated. Additionally, high temperatures induced from welding and grinding typically cause burning of the coatings near the site of the weld and obverse to the steel weld area. Proper repair of these areas includes grinding of all affected areas to fresh steel and re-application of one or multiple coating layers which must also be matched for color and chemical compatibility. Traditionally, the obverse side of many of these installations are left inadequately or completely devoid of proper repair.

Steel surfaces to which fastening must be accomplished between communication equipment and the steel surfaces vary greatly according to radii and angled corners. While welded "stand-off" brackets come in a variety of shapes and sizes, they are not specifically designed to tangentially surface match with these curves and angles of the underlying steel structure. Thus, these existing one-size-fits-all brackets do not maximize the surficial contact areas to provide the maximum amount of application stability. Previous designs also create sharp contact areas which regularly cause sharp abrasion pinch-points to the underlying coatings.

These installations are not low-profile when compared to the steel surface, creating obstructions within the cross-section of access areas. This existing high-profile issue causes a top-heavy high-profile connection which may structurally fail when induced to seasonal external environmental forces such as wind and ice dynamic loading characteristic of elevated structures

SUMMARY OF THE INVENTION

The apparatus and system as disclosed herein are directed to securing hardware to a surface of a structure using one or more torsional joints. The apparatus consists of a main body with a circumferential edge and at least two outwardly extending legs. The apparatus also includes at least one, and typically more, distal pads with opposed first and second planar surfaces. The distal pads are connected by at least two outwardly extending legs by longitudinally opposed first and second torsional joints, also known as tendons. At least one attachment device is mounted to the lower surface of the distal pads. In operation, the torsional joints are rotatable thereby allowing alignment of the attachment device with the surface of the structure to maximize surface contact.

The apparatus and system disclosed herein allow for an optimal low-profile hinging system by allowing live hinging (axial plastic deformation) to occur through the torsional joints longitudinally separated from another along the distal pad. The amount of plastic deformation can be reduced by annealing the metal which improves the ability of the torsional joint to withstand torsional bending cycles. The torsional joints structurally support the distal pad and allow the distal pad to pivot rotationally upon the axis of the tendon thus matching the tangency of a surface topography for optimal fastening. This apparatus and system minimize the need for additional parts and fabrication effort by creating a live-hinge within a body of material that connects the distal pad to a main bracket body.

Distal pads either alone or in plurality allow optimized tangency to a multitude of substrate surfaces (wood, metal, concrete for example). Setting a plurality of linked distal pads in parallel with one another can be extremely useful when seeking to secure hardware to a structure. Distal pads in parallel arrangement allow the fastened mass, which may be, for example a bracket or cabinet among other items, to be effectively super-elevated above a multitude of substrate topographies. Non-parallel distal pad arrangements may be employed to produce an optimized tangency fastening to a conical or spherical surface, also referred to as a substrate.

The total mass of the torsional joints is preferably as large as possible to absorb internal strain and reduce work-hardening when a live-hinge operation occurs. This also increases useful bending cycles. Tendon cross-section is preferably in the range of 1:1 (height to width). A torsional joint that is too narrow does not effectively use the material thickness and a torsional joint that is too thick creates a tearing moment strain on the connection ends. Both are undesirable geometries that should be avoided.

Torsional joints within a distal pad are axially positioned thereby creating a well-defined axis of rotation. Typically, two torsional joints are employed with the distal pad to firmly hold the distal pad to the main body of the bracket. The location of the torsional joints is preferably low to the mass of the main body and as centralized to the centerline of fastener-to-surface force as possible thus creating a structure that reacts to loading with minimized moment loading to both the main body and the distal pads.

The disclosed brackets also can be linked together. It is contemplated by this disclosure that multiple brackets either identical, or bracket variants, are link compatible with one other. Linking is efficient from the perspective of maintaining a narrow inventory of main body configurations. Because the disclosed main body, distal pad and torsional joint configuration is so adaptable to not only the surfaces to which it can be applied but also to the topography of the surface fewer bracket configurations are required. When linking brackets, the distal pads are designed to not interfere with the adjacent distal pad. Linked brackets can provide optimized fastening to flat as well as curved surface topographies. A second bracket linked to the first that is exposed to a distinct topography can be adjusted to accommodate the varied topography.

The disclosed apparatus and system optionally employ a mechanism to optimize placement, adjustment and removal of the bracket from the surface of the structure. A flange extending outwardly from the distal pad, used for mechanical leverage by the operator, can be used to facilitate rotation of the distal pad to the desired orientation to maximize surficial contact of the attachment device with the surface of the structure.

In another disclosed embodiment, a threaded bolt can be fastened within the midsection of a distal pad to produce separation between the distal pad and the underlying surface. The threaded bolt can be unthreaded thus providing a controlled mechanical (or magnetic) proximity connection between the distal pad and the substrate. The threaded bolt can also be used to provide force to release the distal pad by providing pressure between the distal pad and attachment surface.

The disclosed apparatus and system can create three dimensional structures by elevating the bracketing bodies into a multiplanar configuration. In this way, risers such as boxes and elevated structures can be interconnected. These configurations may require the distal pad to be at a perpendicular angle to the bracketing body.

Additional attributes of the disclosed apparatus and system are that rotational and lateral deformation within the span of the tendon length is mitigated with a closely proximal material that forms a bumper that can brace the tendon during rotational bending operations. Moreover, damage from corner impacts close to the tendon can be protected with an extension of material outward from the tendon material thus forming an impact bumper. The impact bumpers may be omitted or folded when they could impinge into the substrate surface.

The attachment devices employed by the apparatus and system may not be linearly disposed within the body of the distal pad. The attachment devices, such as magnets or suction cups, can be clustered together in a manner that provides an optimal fastener density within the boundary of the distal pad. Additionally, the torsional joints do not necessarily need to penetrate the boundary of the distal fastener pad or the bracketing body. However, penetrating these boundaries allows for an efficient and optimal length of tendon, thus allowing the rotational stress impressed upon the material to be longitudinally spread and mitigated from premature material damage. A longitudinally extended tendon allows for maximum material, not so localized, that can experience plastic rotation thereby reducing material strain and increasing torsion duty-cycles as compared to a shorter tendon.

An additional benefit to the disclosed apparatus and system is the ability to mitigate passive intermodulation (PIM) which is a pernicious and destructive phenomenon for cellular network operators. The mitigation of PIM is critical in cellular design and build outs. PIM shows up as a set of unwanted signals created by mixing two or more strong radio frequency (RF) signals and mixing in a non-linear device. These non-linear devices, or junctions, occur in improperly tightened, damaged, or corroded connectors or in damaged antennas. Rusty components, such as mounts and bolts, are also suspect when hunting for sources of PIM. Because the disclosed apparatus and system is tightly fabricated from stainless steel and includes only fasteners fabricated from stainless steel there is very little opportunity for the occurrence of PIM.

The disclosed apparatus and system provide that material spacing between the distal fastening pad and bracketing body allows manual control of the bracket in the manner of installation, adjustment, removal, and manual rotation of the pad upon the axis of rotation. Distal pads, and the associated attached devices mounted to the distal pads, can readily be rotated ninety degrees, or more, to accommodate complex topographies. Additionally, the distal pads, torsional joints and main body may be comprised of a monolithic material or fastened together from separate components in any arrangement that bonds these functional members together.

It is an object of the apparatus as disclosed herein to be able to accommodate a wide range of building surface geometries thereby reducing the number of brackets that are required within the inventory. Because of the considerable flexibility and adaptability of the apparatus disclosed herein it offers the user a far greater range of applications per any main body configuration.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

The disclosed technology is directed to an apparatus for securing hardware to a structure through various attachment mechanisms. By using torsional deflection of joints fabricated within the apparatus itself, the apparatus can align the selected attachment mechanism to the topography of the surface of the structure. The surface of the structure can be flat, stepped, concave, convex, or form any number of angles.

Figure 1:
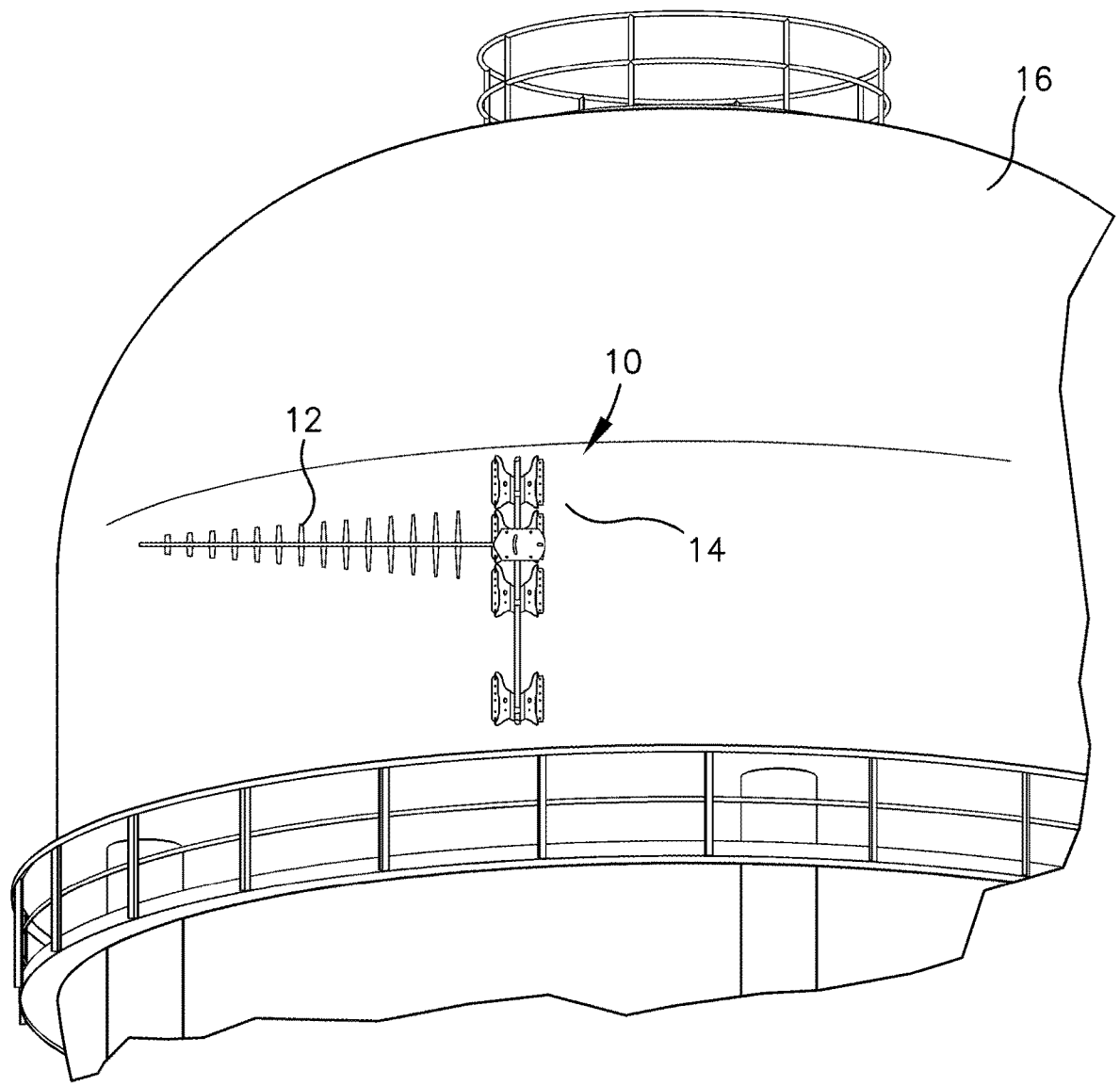
FIG. 1 illustrates a perspective view of an embodiment of a linked bracket apparatus secured to the surface of a water tower structure.

FIG. 1 illustrates an embodiment of the apparatus 10 for securing hardware 12 to a surface 14 of a structure 16 as disclosed herein. As detailed above, the apparatus 10, also commonly referred to in some instances as a bracket, is used to secure the hardware 12 such as antennas, conduit, and cabling, among other items, to the surface 14 of the structure 16. The structure in this instance may be a water tower, an exterior substrate of a building, a cell tower, or any other structure to which a bracketing apparatus need be applied.

Figure 2:
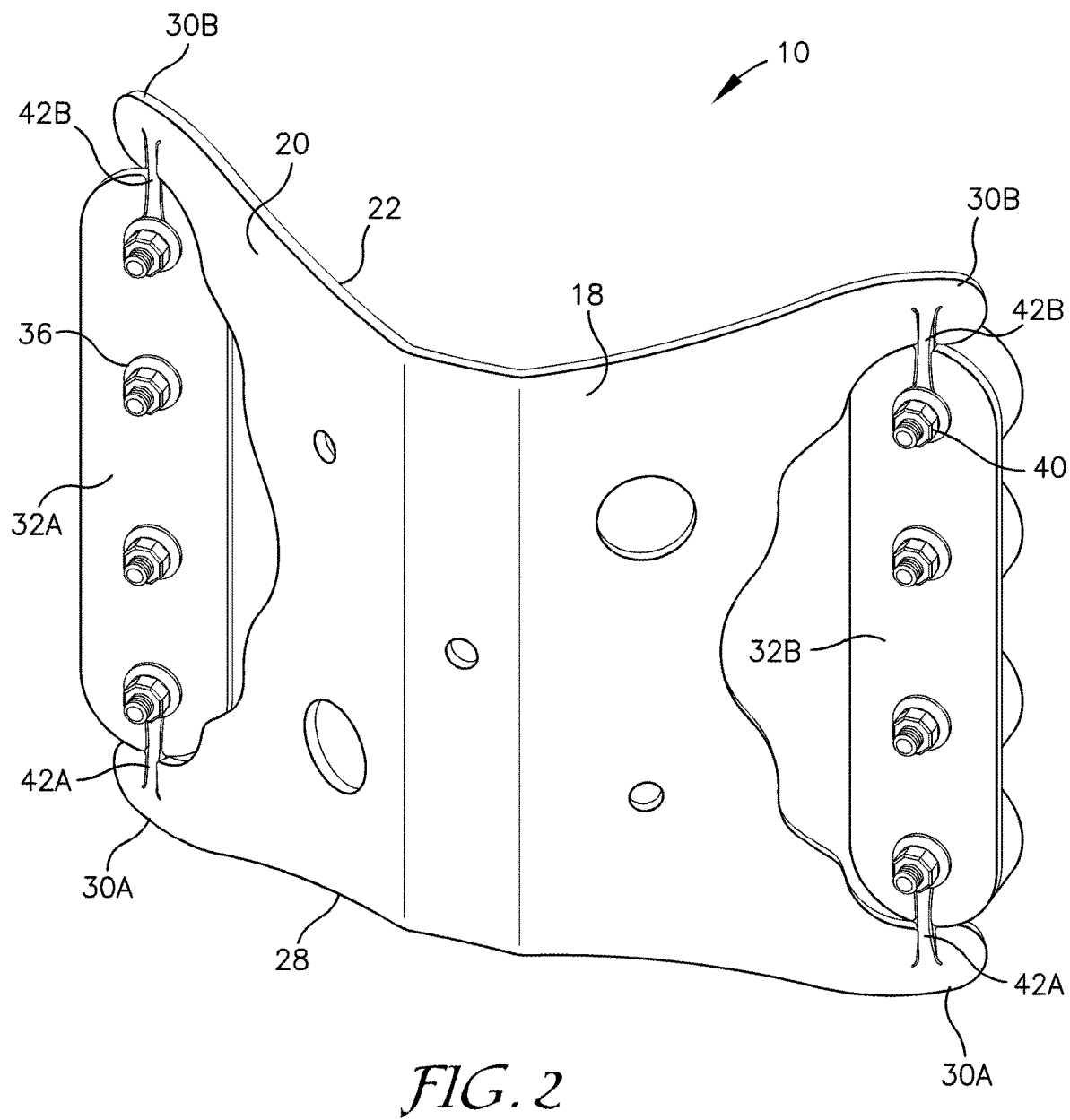
FIG. 2 illustrates a perspective view of an embodiment of the apparatus.

In a first embodiment as illustrated at FIG. 2, the apparatus 10 includes a main body 18. The main body is preferably fabricated from a rigid material that does not readily elastically deform, to include metals such as steel or aluminum; however, other materials such as an engineered polymer that are capable of modest deformation without immediately fracturing may also be utilized. The main body 18 in the first embodiment is arcuate shaped with upper and lower surfaces 20, 22 and includes at least one opening 24 and a cutout 26 to facilitate grasping by the human hand. While the first embodiment is shaped arcuately, the shape of the main body 18 in all embodiments should not be construed as constrained to the configuration depicted in FIG. 2 as a main body that is flat, or substantially flat, may also be employed.

The main body 18 of the first embodiment includes an outwardly extending circumferential edge 28 as well as two outwardly extending sets of legs 30A, 30B. Connected to each of the outwardly extending sets of legs 30A, 30B are two distal pads 32A, 32B each with an upper and a lower surface 34A, 34B. Each of the distal pads 32A, 32B includes at least one, and preferably several, through holes 36 for the mounting of attachment devices 40 (for holding hardware 12 to include cables, conduit, etc.). These through holes 36 may be of the same or different diameters or may be rectangular slots in the main body 18. These varying dimension and geometry holes 36 allow for a wide variety of top mounted attachment devices 40. The through holes 36 are optimized to position the holding attraction on the upper area of the bracket. The distal pads 32A, 32B are connected to the main body 18 by a pair of torsional joints 42A, 42B also referred to in this disclosure as "tendons."

An exemplary range of thickness for an apparatus 10 fabricated from stainless steel for the functional applications contemplated herein are 10-12 gauge. Aluminum and other softer metals may; however, require a thicker gauge in the range of 8-10 gauge. The appropriate thickness of an engineered polymer will depend primarily upon the mechanical properties of the polymer, the anticipated loading of the apparatus 10 and the attachment devices 40 secured to the apparatus. The apparatus 10 may also optionally be painted, or powder coated, to prevent oxidation of the surface of the apparatus.

The apparatus 10 as disclosed herein in the first embodiment is preferably fabricated from a single continuous sheet of material, whether it be metal, an engineered polymer or some other structural type of material as detailed above. The apparatus 10 is preferably precision cut by a laser or a water jet resulting in a finished component as illustrated in FIG. 2. The torsional joints 42A, 42B are continuations of material that connect the outwardly extending legs 30A, 30B to the distal pads 32A, 32B.

Figure 3:
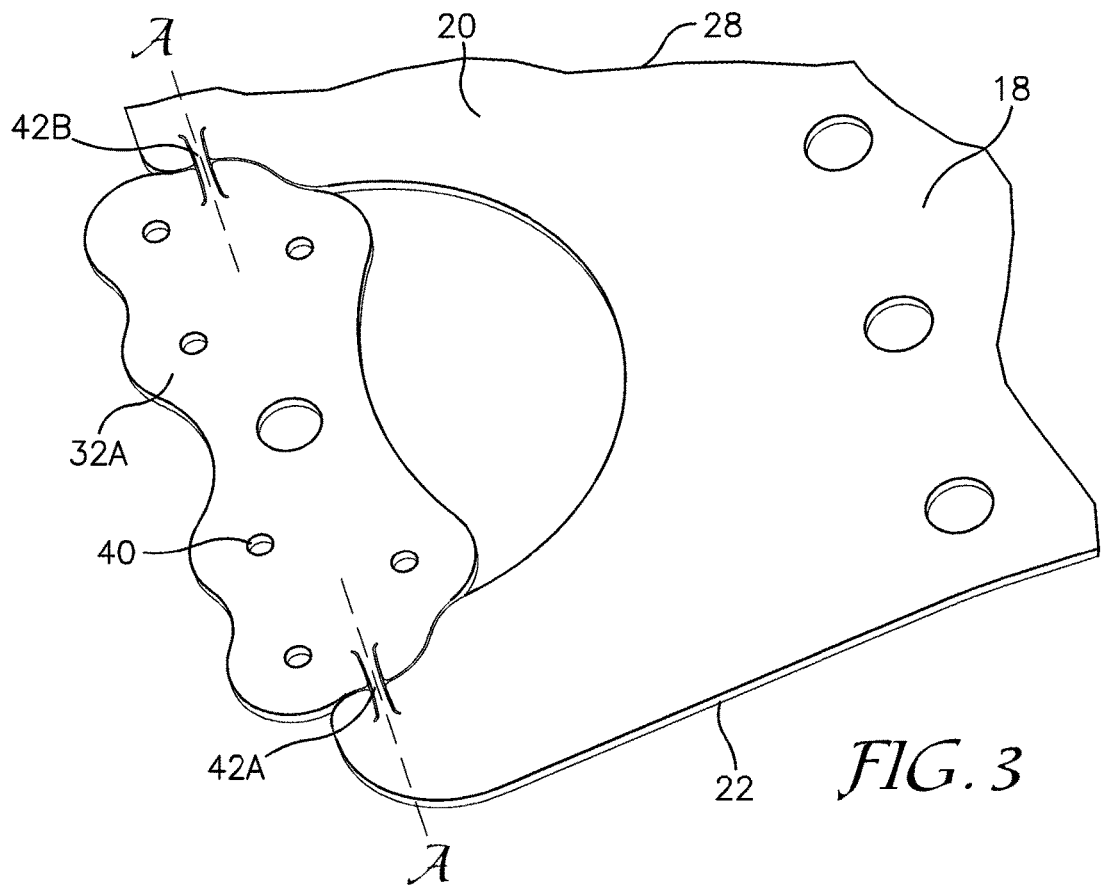
FIG. 3 illustrates a perspective view of an embodiment of a distal pad connected to the main body of the apparatus by torsional joints.

The torsional joints 42A, 42B structurally support the distal pads 32A, 32B and allow the distal pads to rotate about axis "A" of the torsional joints as illustrated in FIG. 3. This functionality allows the distal pads 32A, 32B connected to the torsional joints 42A, 42B to match the tangency of the surface topography for optimal fastening. Alternative embodiments need not necessarily be fabricated from a monolithic material and may be fastened together in any arrangement that bonds the functional components together. Alternative embodiments are more fully described below in this disclosure.

The total mass of the torsional joint 42A, 42B (the cross-sectional area of the joint multiplied by torsional joint length) is preferably as large as possible to absorb internal strain and to reduce work hardening when the hinge is manually manipulated to achieve the desired surface tangency of the attachment mechanism. Additionally, increasing the total mass of the torsional joint 42A, 42B increases the useful bending cycles that the joint can withstand prior to failure.

This is an important consideration with the apparatus 10 as disclosed herein because the apparatus can readily be removed from the surface 14 of the structure 16 to which it is attached and repositioned elsewhere on the structure or moved to another structure with a distinct topography and therefore a need to again rotate the torsional joints 42A, 42B to accomplish alignment of the distal pads with the surface topography. Consequently, much of the utility of the apparatus 10 as disclosed herein arises from the capacity for reuse. The apparatus 10 is readily reconfigurable to accommodate new hardware 12, i.e., conduit, antennas, cabling, etc., on a distinct surface topography. As cabling systems are upgraded, for example, the apparatus 10 may be repurposed with only minor manual adjustments to the distal pads 32A, 32B to align them with the orientation of the new surface by rotation of the torsional joints 42A, 42B.

The cross-section of the torsional joint 42A, 42B is preferably at a ratio of about 1:1 (length to width) which has been found to optimize the functionality of the joints 42A, 42B. While the criteria set forth above provides a guidepost for fabrication of the torsional joints, the total joint mass cannot be so large that manual manipulation of the distal pads and rotation of the torsional joints cannot be accomplished because the requisite force to accomplish the desired rotation exceeds the strength of the typical human hand and arm.

Figure 4A:
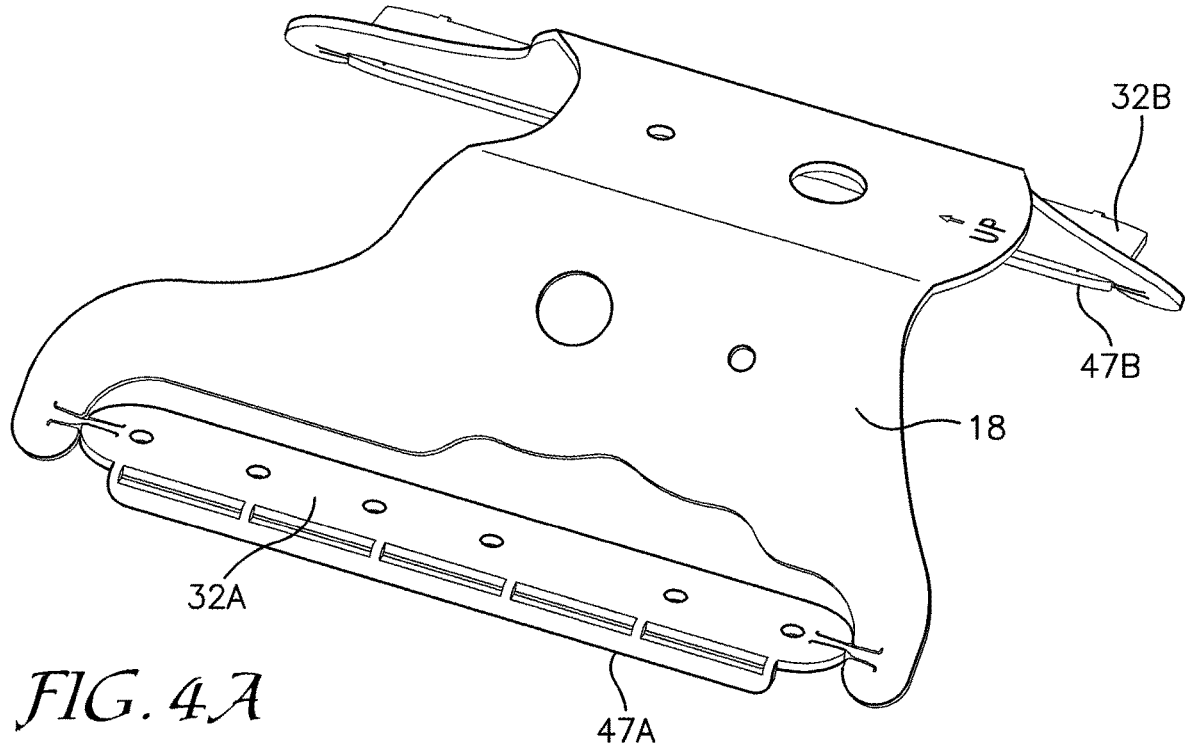
FIG. 4A illustrates a perspective view of an embodiment of a main body and distal pads with side stiffeners.
Figure 4:
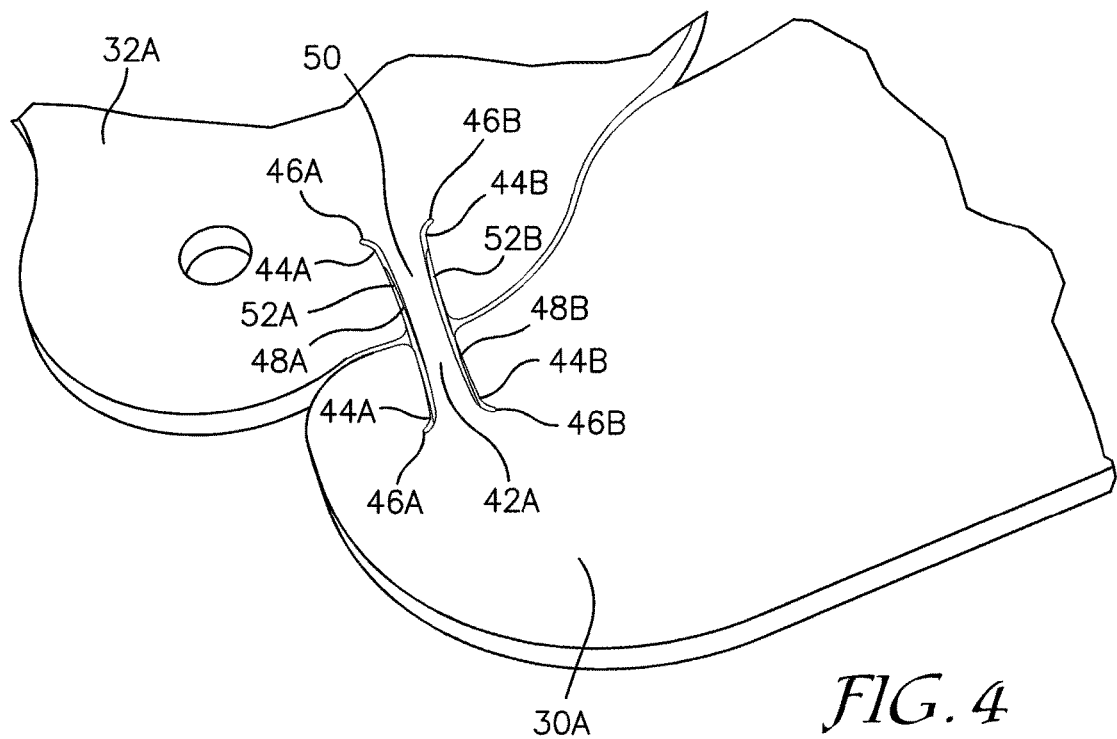
FIG. 4 illustrates another perspective view of an embodiment of a distal pad connected to the main body of the apparatus by a torsional joint.

As best illustrated in FIG. 4, the torsional joints 42A, 42B optionally also employ stress-riser mitigation flares 44A, 44B. These flared segments diverge from one another and serve to separate the endpoints 46A, 46B to reduce the potential for the formation of a stress crack extending from one or both endpoints 46A, 46B toward one another. A stress crack extending between the two endpoints 46A, 46B may result in a disconnection of the torsional joint 42A or 42B from either the distal pad 32A, 32B or the outwardly extending legs 30A, 30B. Such a disconnection would effectively disable the full functionality of the apparatus 10 preventing it from securely connecting hardware 12 to the surface 14 of the structure 16. Consequently, while the stress-riser mitigation flares 46A, 46B are optional, they are highly recommended for use with the apparatus 10 as disclosed herein.

The channels 48A, 48B, as illustrated in FIG. 4, that cut entirely through the thickness of monolithic material of the apparatus 10 are preferably in the range of 0.010 to 0.020 inches in width. A channel of sufficient width is essential to accommodate the rotation of the torsional joint without causing excessive binding of the main body 50 of the torsional joint 42A as against the opposing sides 52A, 52B of the channel 48A, 48B. Rotational and lateral deformation within the span is however, desirably mitigated with closely spaced material that forms an impact bumper that can brace the torsional joint 42A during rotational bending operations. This captive feature of the torsional joint between the two channels guides the joint along a linear path and reduces undesirable lateral movement of the joint.

Consequently, the width of the channels 48A, 48B in any apparatus configuration 10 must in effect be "tuned" to the geometry, material choice and overall apparatus dimensions to achieve optimal results. Excessively wide channels 48A, 48B may not provide a sufficient impact bumper 52A, 52B, while a channel that is too narrow can undesirably bind the torsional joint 42A, as illustrated at FIG. 4, thereby diminishing the effectiveness of the torsional joints.

Another embodiment of the disclosed apparatus and system as seen in FIG. 4A employs strategically configured and disposed stiffeners 47A, 47B. Stiffeners 47A, 47B may be used to enhance the rigidity of the distal pads 32A, 32B. The stiffeners 47A, 47B are effectively flanges that are bent, either downwardly or upwardly, at roughly ninety-degree angles to the distal pads 32A, 32B. The stiffeners 47A and 47B may either be continuous, or intermittent in their longitudinal extension, depending upon the anticipated loading of the apparatus 10.

Figure 5:
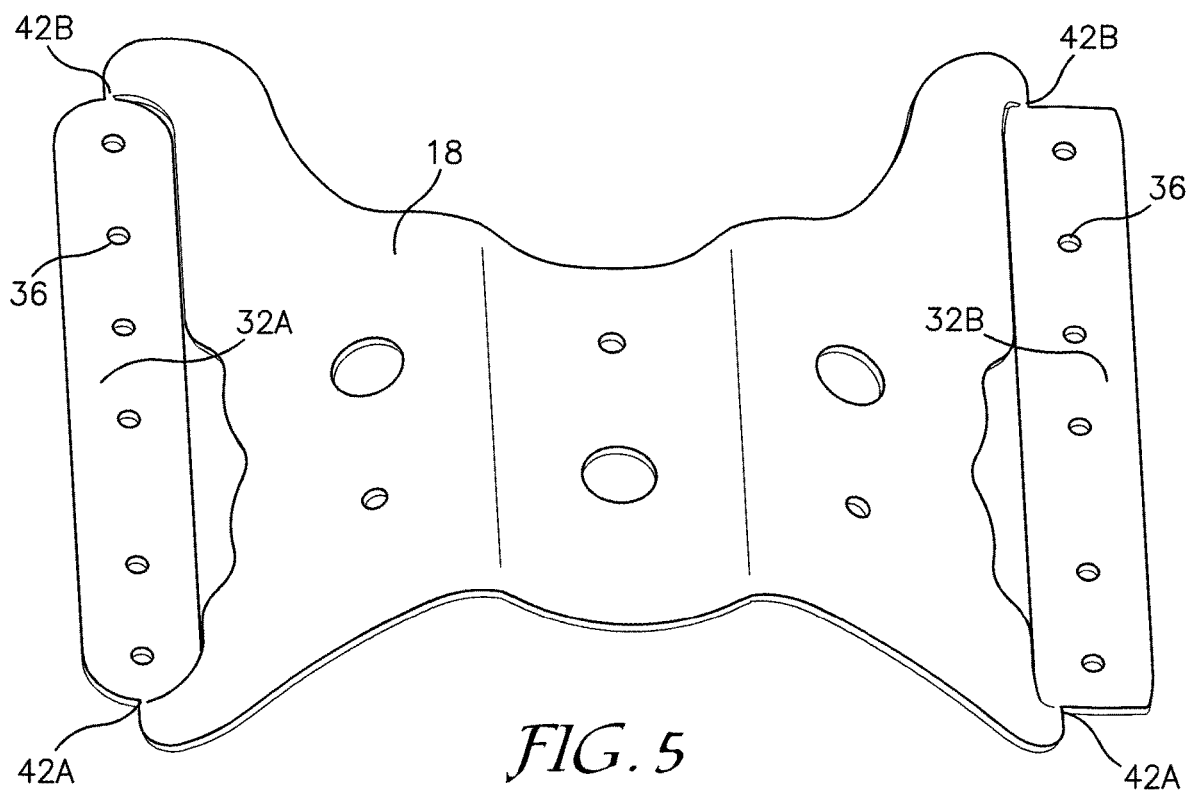
FIG. 5 illustrates a perspective view of an embodiment of torsional joints that do not penetrate the boundary of the distal pad or main body.

An alternative embodiment of the torsional joint 42A, 42B, as illustrated in FIG. 5, does not require that the torsional joint penetrate the boundary of the distal pads 32A, 32B or the main body 18. Nonetheless, empirical results reveal that penetrating the boundaries of the distal pad 32A, 32B and the main body 18 allows for an efficient and optimal length of tendon 42A, 42B, thereby reducing angular rotation per unit length of tendon material. Penetrating the boundaries effectively allows the rotational stress imposed upon the joint material to be longitudinally spread, and mitigated, thereby avoiding premature material damage resulting in failure of the torsional joints 42A, 42B.

Figure 6:
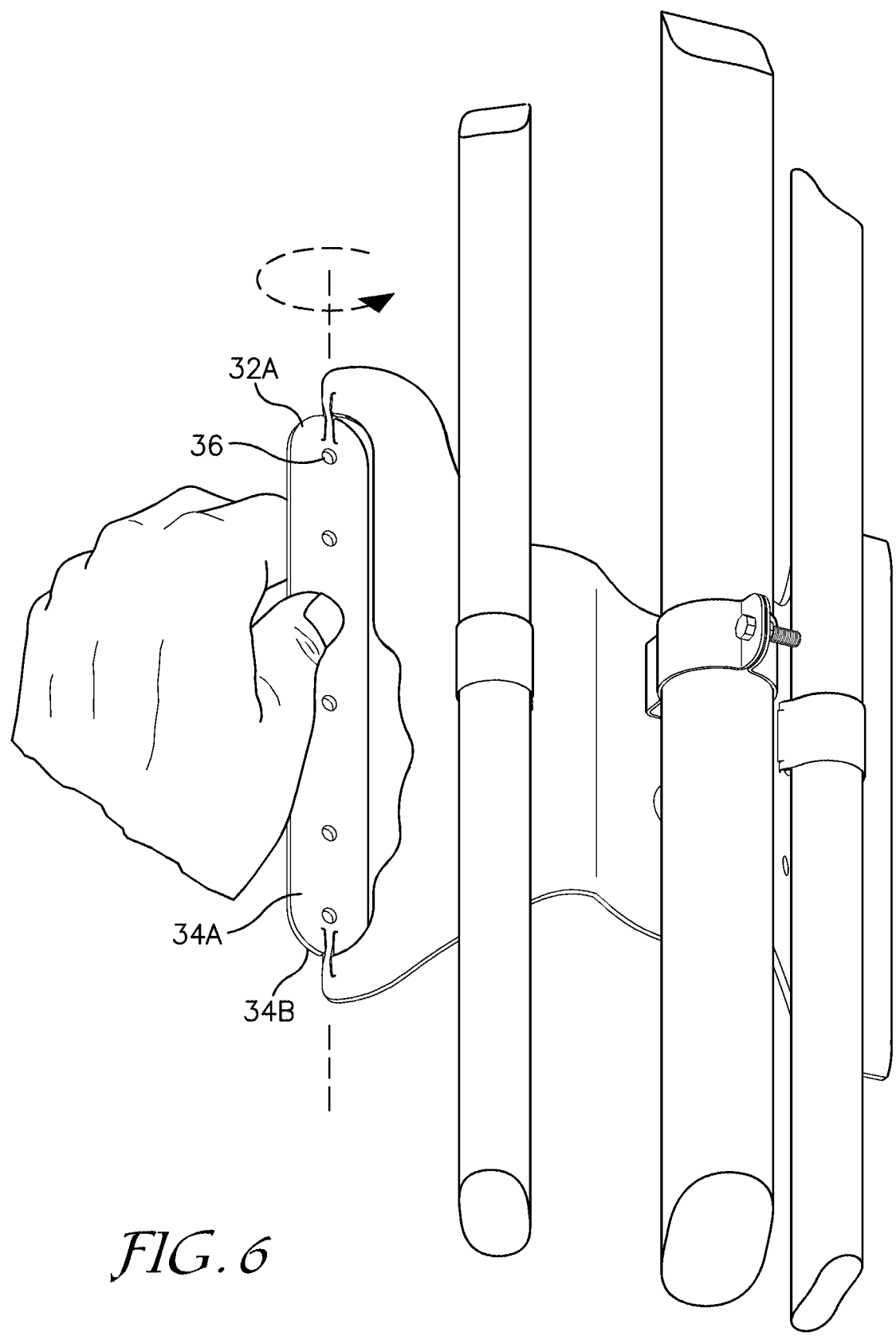
FIG. 6 illustrates an embodiment of the apparatus undergoing manual rotation of a distal pad.

As detailed above, the distal pads 32A, 32B have an upper and a lower surface 34A, 34B, as illustrated at FIG. 6, and through holes 36 in the pads. The through holes 36 are intended to accommodate the attachment of various devices for securing the apparatus 10 to a surface 14 of a structure 16. Exemplary attachment devices 40 include, among others, magnets, snaps, suction cups, pressure sensitive adhesives, buckles, clips, hook and loop fasteners and threaded fasteners. Once secured to the distal pads 32A, 32B through a hole 36 the attachment device 40 may be secured to the desired surface 14 of the structure 16. To secure the attachment device 40 to the surface 14 of the structure 16, the distal pads 32A, 32B are manually rotated, as seen in FIG. 6, to align the attachment device 40 with the surface to which the apparatus 10 is to be attached.

Figure 7:
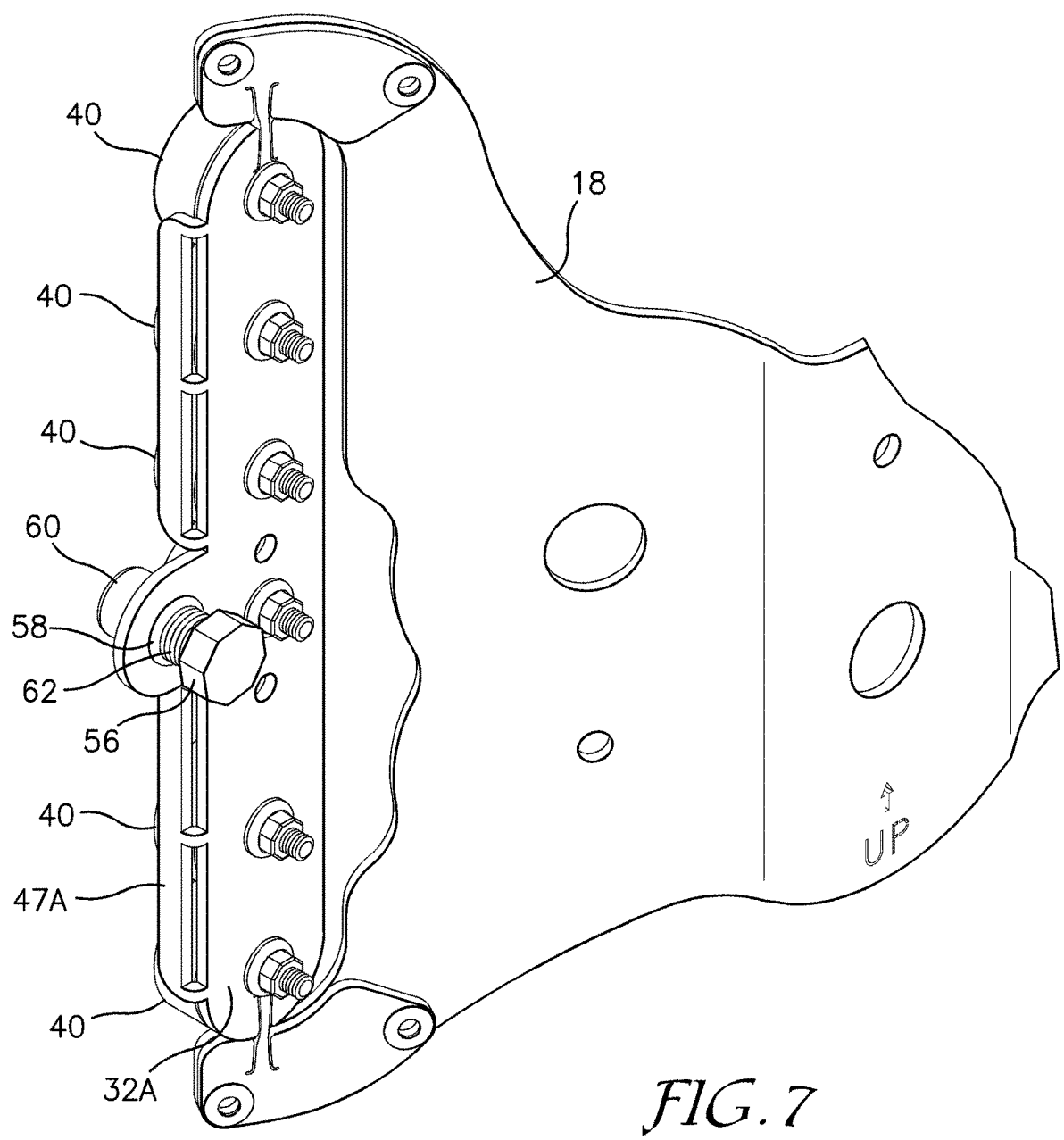
FIG. 7 illustrates an embodiment of a distal pad flange configured with an apparatus removal member.

Another embodiment contemplated by this disclosure and as illustrated in FIG. 7, includes one or more adjustment members 56 passing through an opening 58 in at least one of the distal pads 32A, 32B. The adjustment member 56 is preferably an internally threaded member 60 aligned with the opening 58 and is secured to the lower surface 34B of the distal pads 32A, 32B. An externally threaded member 62 extends through the opening 58 and is threadedly received into the internally threaded member 60.

In operation, the externally threaded member 62 may be rotationally, and incrementally, advanced into contact with the surface 14 of the structure 16 thereby distancing the distal pad 32A, 32B from the surface of the structure until the resistance attributable to attachment device 40 is overcome. The externally threaded member 62 may be rotated into the internally threaded member 60 advancing the externally threaded member against the surface of the structure and causing the distal pads 32A, 32B to move away from the surface of the structure. As the distal pads move away from the surface of the structure the magnetic attraction, suction force, hook and loop engagement, and other means of adherence associated with the attachment device 40 diminishes until finally overcome by distance and the apparatus 10 separates from the surface 14 of the structure 16.

An alternative embodiment utilizes a threaded opening 58 and a threaded member 62 that can be rotationally advanced into and through the opening 58. As the threaded member 62 advances, as with the prior embodiment, it ultimately contacts the surface of the structure. Once the surface of the structure is contacted it begins to apply pressure to the surface and a counter force is exerted on the attachment device 40. The counter force ultimately overcomes the connective force of the attachment device 40 and the bracket apparatus 10 is released from the surface 14.

Figure 8:
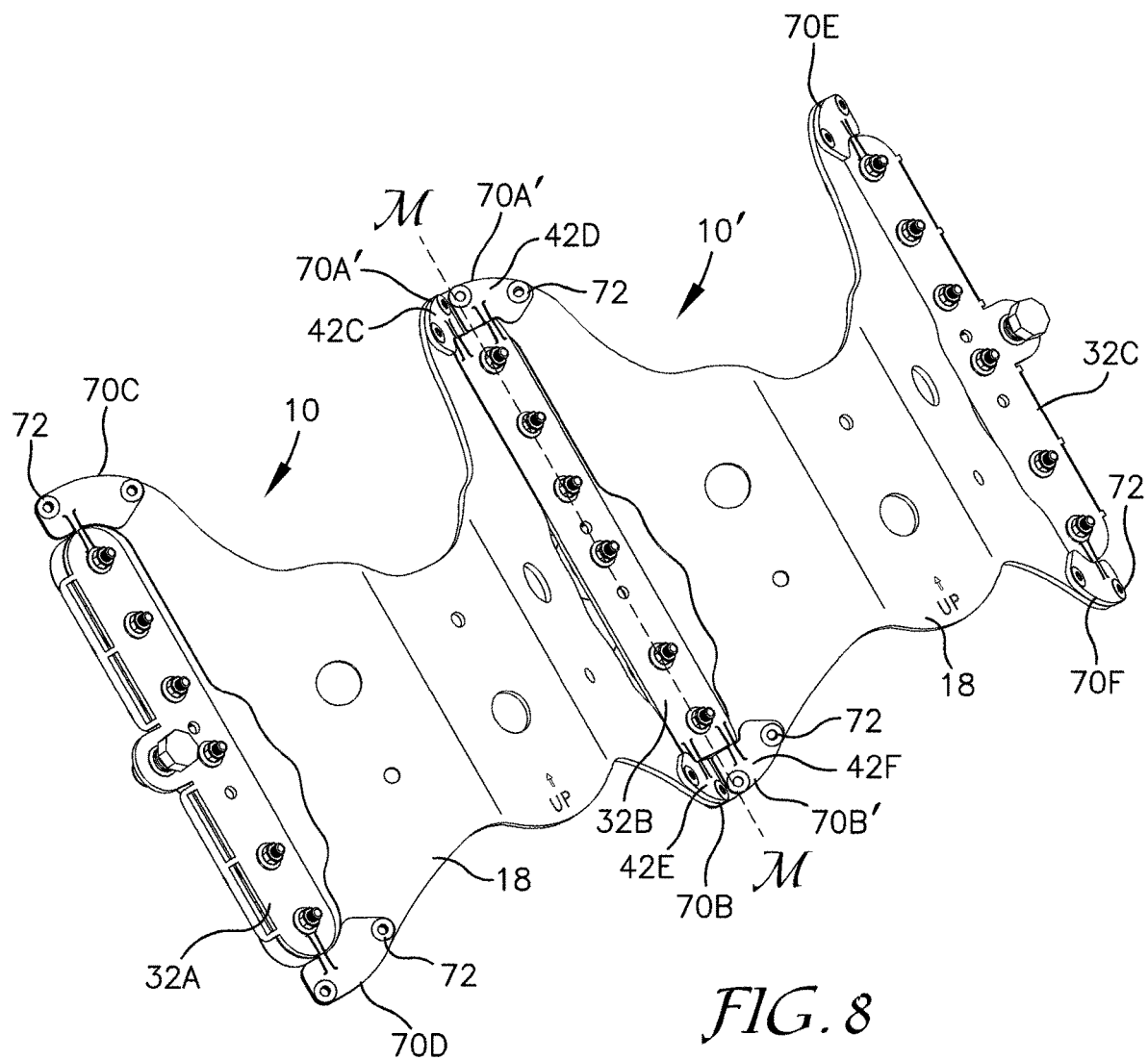
FIG. 8 illustrates an embodiment of linked apparatuses.

Another embodiment of the apparatus is illustrated in FIG. 8. In this embodiment there are two bracket apparatuses 10, 10' secured to one another. In this embodiment, the bracket apparatuses 10, 10' utilize a total of three distal pads 32A, 32B, 32C. The center distal pad 32B serves to connect the first two brackets 10, 10' at a midline "M". The center distal pad 32B utilizes a total of four torsional joints 42C, 42D, 42E and 42F that span between the distal pad 32B and four connection members 70A, 70A', 70B, 70B'.

The outer distal pads 32A, 32B may either utilize connection members 70C, 70D, 70E and 70F as shown in FIG. 8 or in an alternative embodiment extend, without material interruption, from the distal pad into the main body 18. The connection members are preferably fastened to the main body 18 by rivets 72; however, other fastening means, such as threaded fasteners and even adhesives are contemplated by this disclosure. The specific geometrical configuration of the connection members is not dictated by this disclosure; however, they should ideally contain sufficient material to facilitate the rotation of the longitudinally extending torsional joints to prevent premature failure.

The connection members illustrated in FIG. 8 are utilized in situations where the cost of the material of choice is high, such as stainless steel, and there exists a desire to reduce overall material costs. A cost reduction may be accomplished by substituting, for example, galvanized steel for stainless steel in the fabrication of the larger main body 18. Utilization of stainless steel is desired for the distal pads 32A, 32B and 32C to improve, relative to galvanized steel, the corrosion resistance of the torsional joints 42A, 42B. Other material options may be similarly impacted and require the use of dissimilar materials for the distal pads as compared to the main body and torsional joints. The distal pads 32A, 32B need not be connected to the main body 18 via torsional joints 42A, 42B using connection members 70C, 70D, 70E and 70F but may optionally rely upon the use of a homogenous material connection as previously detailed.

Figure 9:
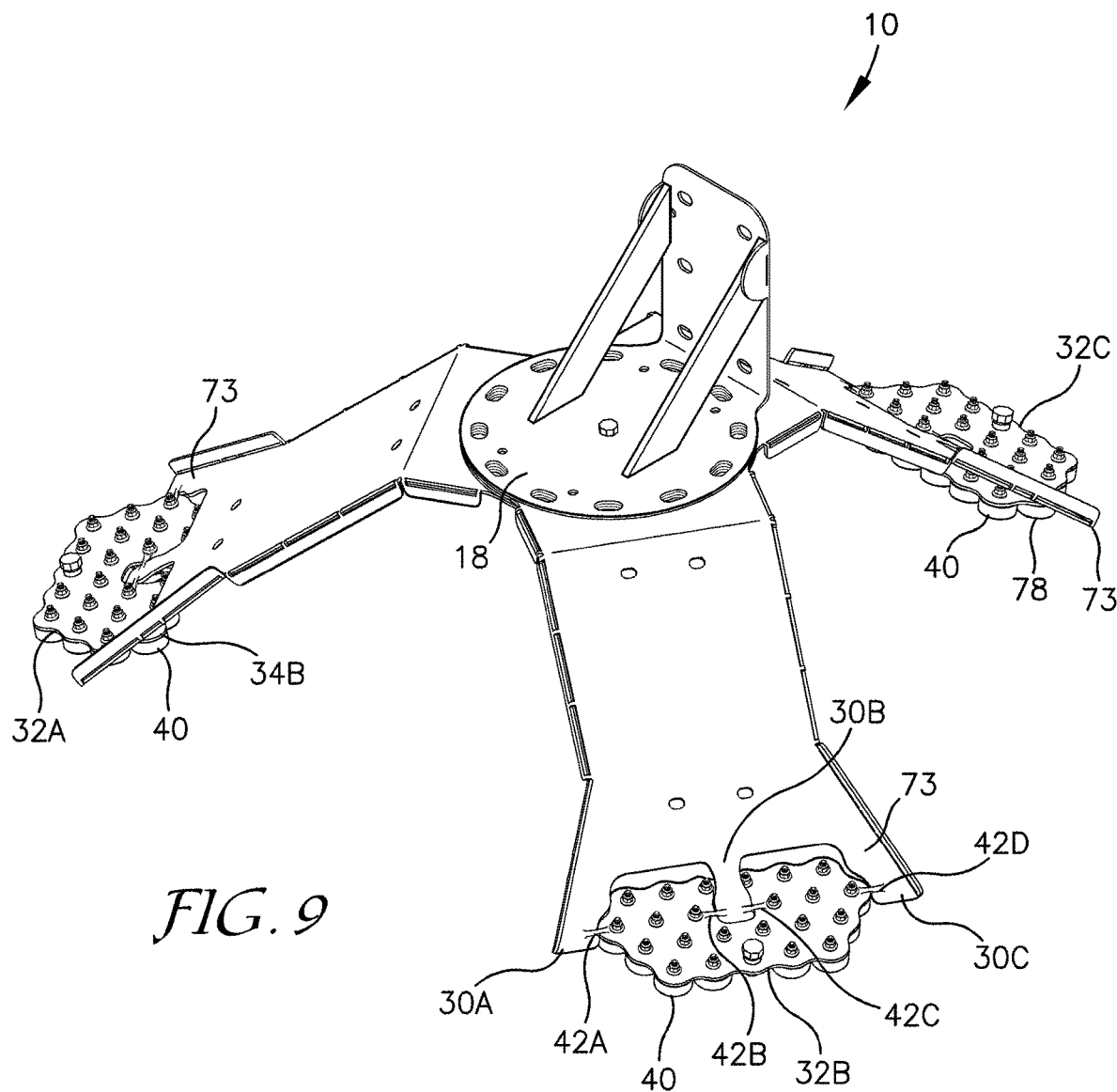
FIG. 9 illustrates an embodiment of an apparatus for securing a mast to the surface of a structure.

Another embodiment of the bracket apparatus 10 as disclosed herein is illustrated at FIG. 9. The apparatus 10 illustrated at FIG. 9 is for securing a mast (not shown) used in communication systems. The apparatus 10 utilizes a main body 18 with three distal pads 32A, 32B and 32C. Extending outwardly from each of the three distal ends 73 of the main body 18 are three leg members 30A, 30B and 30C. The distal pads 32A, 32B and 32C are connected to the three leg members 30A, 30B and 30C at torsional joints 42A, 42B, 42C and 42D. As shown in FIG. 9, a plurality of attachment devices 40 are mounted to the undersides 34B of the distal pads 32A, 32B and 32C. Additionally, as illustrated in FIG. 9 the torsional joints 42A, 42B, 42C and 42D are rotated to align the lower surfaces 78 of the attachment devices 40 for maximal surficial contact with the surface 14 of the structure 16.

Figure 10:
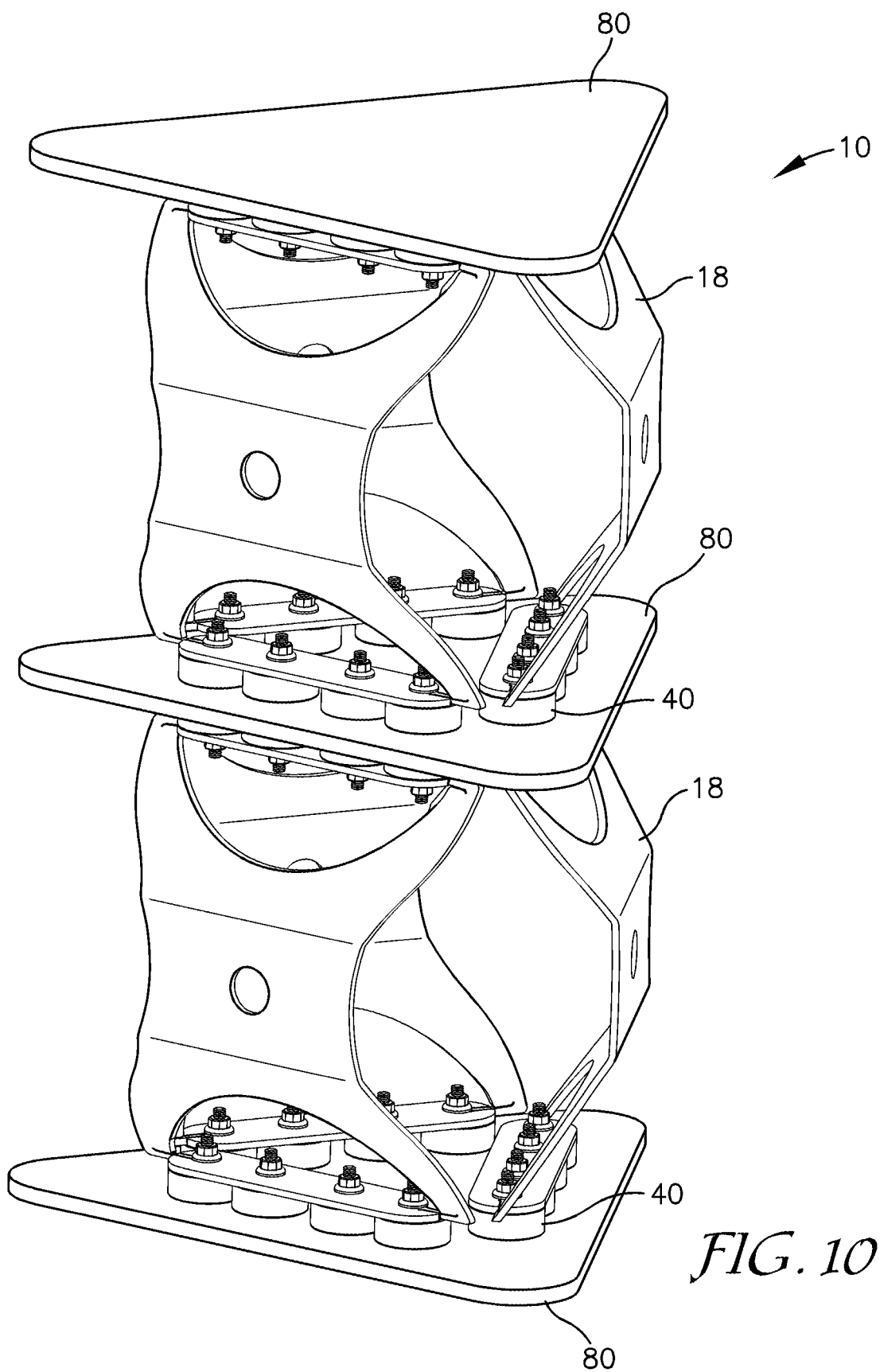
FIG. 10 illustrates an embodiment of multi-planar configuration of apparatuses.

Yet another embodiment of how the apparatus 10 may be utilized is illustrated in FIG. 10. The highly adaptable apparatus 10 may partner with adjacent bracket apparatuses 10 to offset a landing plate 80 from the surface 14 of the structure 16. While a total of three brackets are seen in the configuration shown in FIG. 10, it is contemplated by this disclosure that an even greater number of apparatuses 10 could be employed to produce a similar multi-planar apparatus configuration.

Figure 11:
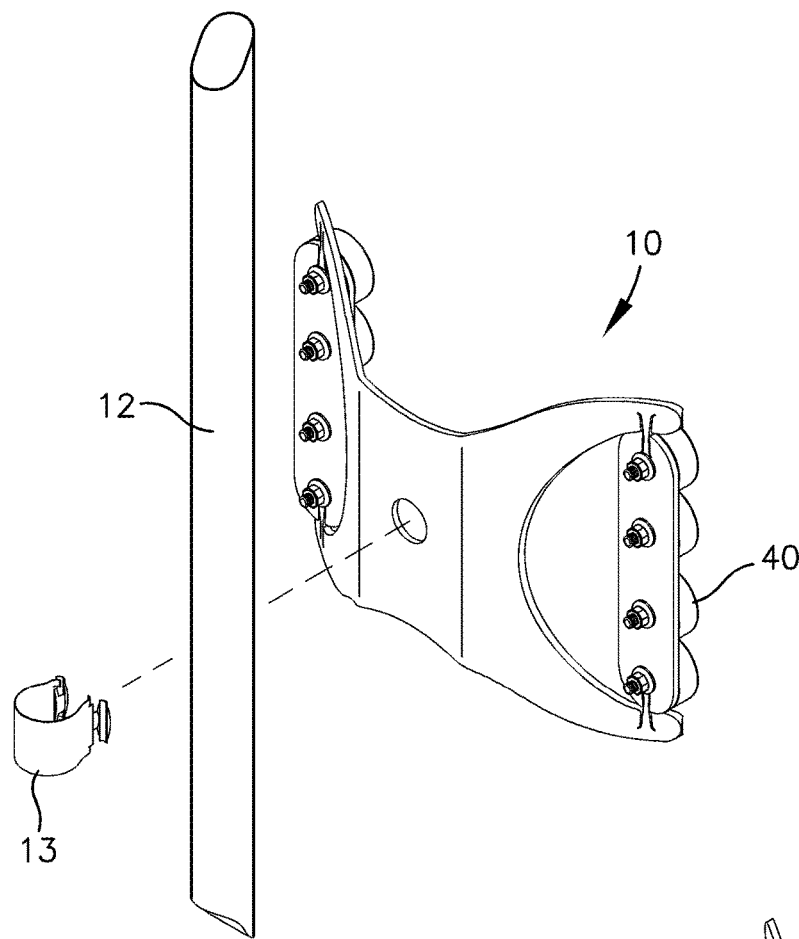
FIG. 11 illustrates an embodiment of the apparatus with hardware attachments prior to mounting to the apparatus.
Figure 11A:
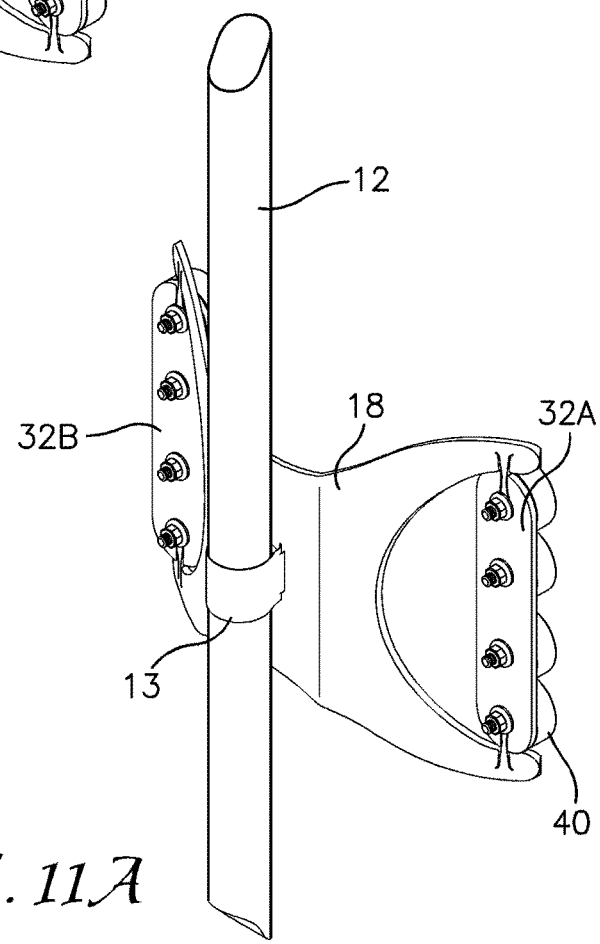
FIG. 11A illustrates an embodiment of the apparatus with hardware attachments secured to the apparatus.

FIG. 11 illustrate an embodiment of an apparatus 10 with hardware 12 prior to installation thereupon and FIG. 11A illustrates the hardware installed thereon. The hardware 12 may be attached with clips 13, threaded fasteners or a multitude of other attachment mechanisms. The type of attachment mechanism selected depends upon the load applied to the apparatus, configuration of the hardware 12 and other variables.

Figure 12:
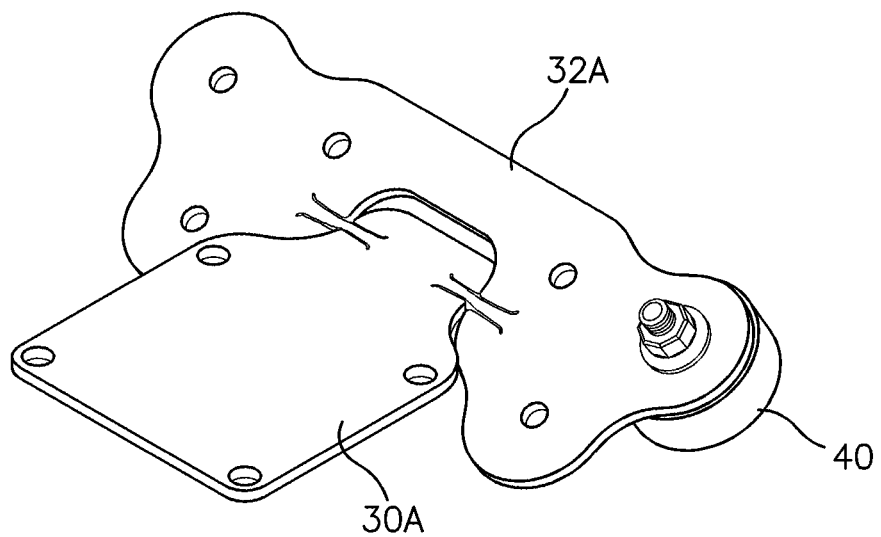
FIG. 12 illustrates an embodiment of the apparatus with a single distal pad.

Another embodiment of the apparatus 10 is illustrated at FIG. 12. This embodiment utilizes a single outwardly extending leg 30A. The main body 18 may, for example, be flat and have an attachment device 40 mounted thereto and yet require the distal pad 32A to rotate to accommodate a surface topography that deviates from that initially encountered by the attachment device 40 secured to the main body 18.

The various embodiments of the brackets detailed above provide a wide range of options for safely and quickly securing cabling and conduits to the exterior and interior surfaces of structures such as water towers. With some of the above detailed embodiments, the distal pads may be rotated in cooperation with the torsional joint to match the radius of curvature of the structure to maximize the surficial contact between the magnetic elements and the attachment surface.

The disclosed apparatus, and systems should not be construed as limiting in any way. Instead, the present disclosure is directed toward all novel and nonobvious features and aspects of the various disclosed embodiments, alone and in various combinations and sub-combinations with one another. The disclosed apparatus and systems are not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

I claim:

1. An apparatus for securing hardware to a surface of a structure, the apparatus comprising:
    a main body, the main body further comprising a circumferential edge and at least one outwardly extending leg;
    at least one distal pad with opposed first and second surfaces, the at least one distal pad attached to the at least one outwardly extending leg with longitudinally opposed first and second torsional joints, wherein each torsional joint comprises a longitudinally extending member with a first edge, a laterally opposed second edge, first and second longitudinally opposed ends and a longitudinally extending axis of rotation; and
    at least one attachment device mounted to the first surface of the at least one distal pad, the at least one attachment device comprising a lower surface, wherein the opposed torsional joints are rotatable thereby allowing rotation of the attachment device to maximize surface contact with the structure.

2. The apparatus of claim 1, wherein the main body and the at least one distal pad is fabricated from a single sheet of material.

3. The apparatus of claim 1, wherein the main body and the at least one distal pad are comprised of a material capable of both elastic and plastic deformation.

4. The apparatus of claim 1, wherein the tendon torsional joint has a cross section with a height dimension and width dimension.

5. The apparatus of claim 4, wherein the height to width ratio of the torsional joint is about 1:1.

6. The apparatus of claim 1, wherein the at least two torsional joints are disposed within the same plane.

7. The apparatus of claim 1, wherein the attachment device is selected from the group consisting of magnets, suction cups, clips, pressure sensitive adhesives, hook and loop, snaps, buckles, and combinations thereof.

8. The apparatus of claim 1, wherein the at least one distal pad comprises at least one through hole for receiving an adjustment member.

9. The apparatus of claim 8, wherein the adjustment member comprises an internally threaded member aligned with the through hole and secured to at least one of the upper surface or the lower surface of the distal pad.

10. The apparatus of claim 9, wherein an externally threaded member is received into the internally threaded member through the through hole.

11. The apparatus of claim 10, wherein the externally threaded member may be advanced through the internally threaded member and into contact with the surface of the structure thereby distancing the distal pad away from the surface of the structure.

12. A bracket for securing hardware to a surface of a structure, the bracket comprising:
   a main body with a circumferential edge and at least one outwardly extending leg;
   at least one distal pad with opposed first and second planar surfaces, the distal pad attached to the main body by at least two longitudinally opposed torsional joints, wherein the torsional joint comprises a strip of material with first and second laterally opposed edges, first and second longitudinally opposed ends and a longitudinally extending axis of rotation disposed between the first and second laterally opposed edges, wherein the first end of the strip of material is coterminous with one of the at least two outwardly extending legs the second end of the strip of material is coterminous with the main body; and
   at least one attachment device mounted against at least one of the planar surfaces, the attachment device for engagement with the surface of the structure, wherein the at least two torsional joints and distal pad may be manually rotated to align the at least one attachment device to achieve maximal contact with the surface of the structure.

13. The bracket of claim 12, wherein the at least two torsional joints, main body and at least one distal pad are comprised of a homogenous material.

14. The bracket of claim 12, wherein the hardware is selected from the group consisting of cables, antennas, lighting, conduit, and combinations thereof.

15. An apparatus for mounting hardware to a surface of a structure, the apparatus comprising:
   a main body with an outer edge and at least one outwardly extending leg;
   a distal pad with an upper and a lower planar surface, the distal pad attached to the main body by at least two torsional joints, the distal pad, main body and torsional joints comprising an integral material with a channel of sufficient width to accommodate the rotation of the torsional joints; and
   at least one attachment device mounted to at least one of the planar surfaces, the attachment device for connection with the surface of the structure, wherein the at least two torsional joints and distal pad are capable of rotation thereby allowing the at least one attachment device to achieve maximal tangential contact with the surface of the structure.

16. A system for mounting hardware; the system comprising
   a structure with a surface;
   a bracket comprising:
      (a) a main body with an upper surface, a lower surface and an outer edge;
      (b) at least one distal pad with an upper and a lower surface, the distal pad attached to the main body by at least two longitudinally opposed torsional joints the at least one distal pad, main body and torsional joints are of a monolithic construction with a channel of sufficient width to accommodate the rotation of the torsional joints without excessive binding of the torsional joints against the main body; and
      (c) an attachment device with a contact surface, the attachment device mounted to at least one of the upper or lower surfaces of the at least one distal pad, the contact surface operable for engagement with the surface of the structure, wherein the at least two torsional joints and distal pad may be manually rotated to achieve maximal surficial contact between the surface of the structure and the contact surface of the attachment device.

17. The system of claim 16, wherein the structure is selected from the group consisting of water towers, cell phone towers and buildings.

18. The system of claim 16, wherein the at least one distal pad of the bracket comprises a first and second distal pad.

19. The system of claim 18, wherein the second distal pad of a first bracket comprises the first distal pad of an adjacent second bracket.

20. The system of claim 19, wherein the second distal pad comprises first and second longitudinally opposed ends.

21. The system of claim 20, wherein the first and second ends of the second distal pad each comprise a torsional joint connected respectively to the first bracket and the second bracket.

22. The system of claim 16, wherein the distal pad comprises a flange extending outwardly from the surfaces of the distal pad, wherein the flange facilitates the application of manual pressure to rotate the distal pad and the mounted attachment device.

23. The system of claim 22, wherein the distal pad further comprises a threaded through hole for receiving a threaded bolt to advance toward the surface of the structure to thereby separate the distal pad from the surface of the structure.

24. The system of claim 16, wherein the at least one distal pad comprises first and second longitudinally extending edges.

25. The system of claim 24, wherein a flange extends downward substantially perpendicularly from at least a portion of the first and second longitudinally extending edges of the at least one distal pad.

26. The system of claim 16, wherein the at least two longitudinally opposed torsional joints, at least one distal pad and main body are all comprised of a homogenous material.

27. The system of claim 16, wherein the at least two torsional joints extend outwardly from the distal pad into separate connection members.

28. The system of claim 27, wherein each connection member is secured to the main body with fasteners.

29. The system of claim 28, wherein the connection members, distal pad and torsional joints comprise a first homogenous material and the main body comprises a second homogenous material.

30. The system of claim 28, wherein the connection member, distal pad, torsional joints and main body all comprise a homogenous material.

31. The system of claim 16, wherein the main body comprises at least one through hole for the mounting of hardware to the main body.

* * * * *